Sept. 15, 1953  W. LOTTER ET AL  2,652,170
PRESSURE COOKER
Filed April 25, 1947  4 Sheets-Sheet 1
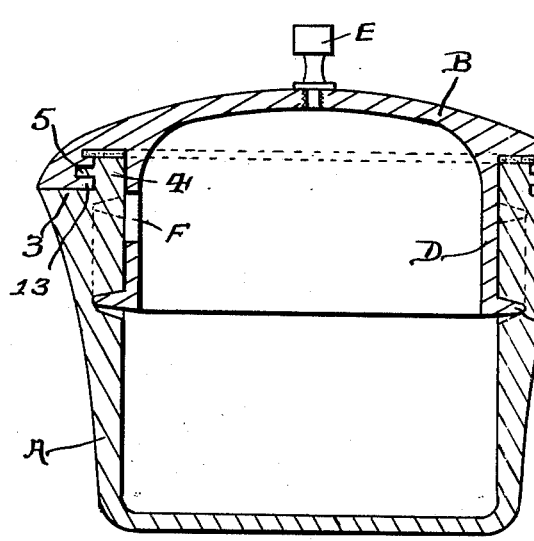
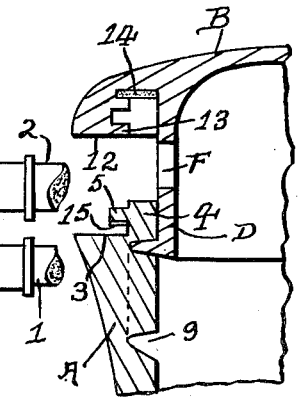
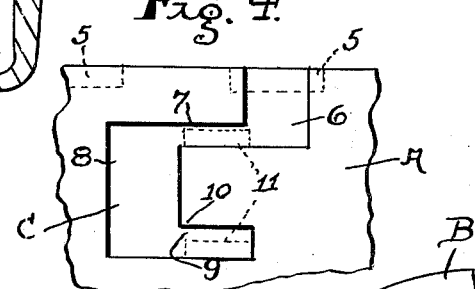
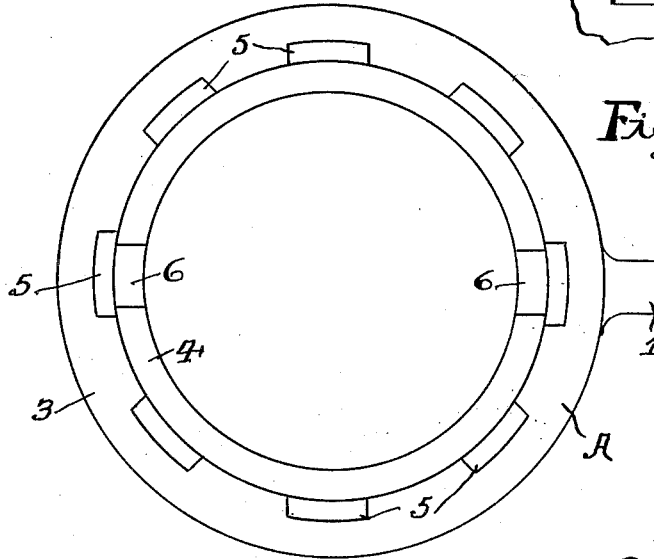
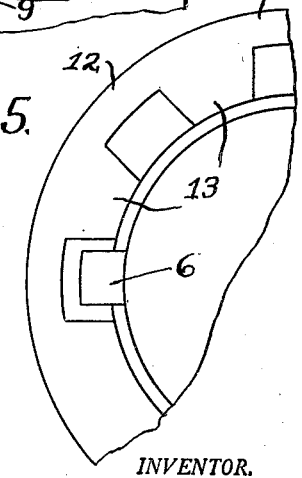
INVENTOR.
Wm LOTTER
M. LOTTER
BY
Patterson, Wright & Patterson
Attorneys Sept. 15, 1953     W. LOTTER ET AL     2,652,170
PRESSURE COOKER Filed April 25, 1947                                               4 Sheets—Sheet 2

INVENTOR.
W.M. LOTTER
BY     M. LOTTER

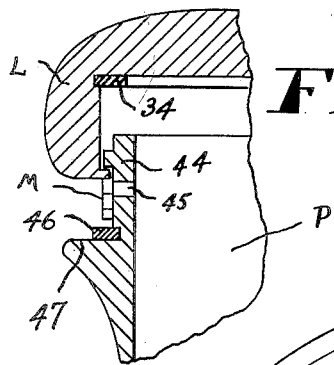
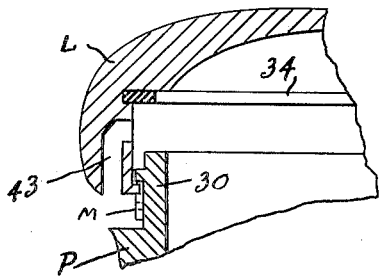
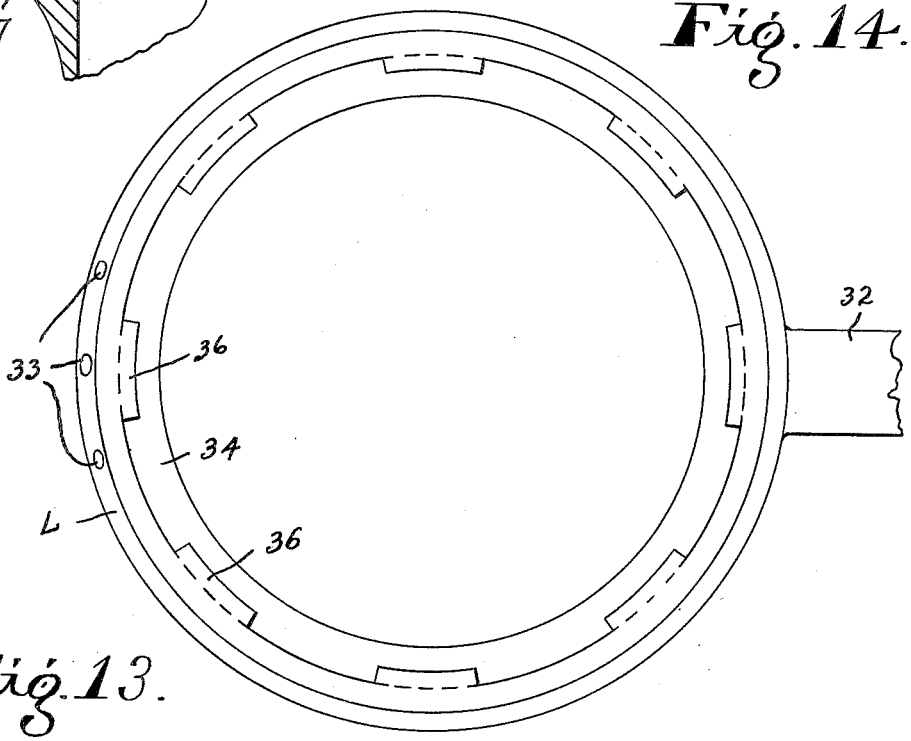
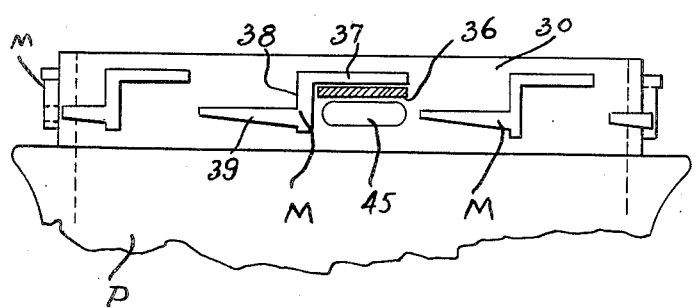

Patented Sept. 15, 1953

2,652,170

UNITED STATES PATENT OFFICE 2,652,170

PRESSURE COOKER

William Lotter and Minna Lotter, St. Louis, Mo.

Application April 25, 1947, Serial No. 743,992

2 Claims. (Cl. 220—40)

This invention pertains to providing a pressure cooker which can be used with greater safety than can be pressure cookers as they are now commonly and ordinarily made.

In the use of a pressure cooker high internal pressures are built up in the cooker and although it is common knowledge that the cooker should not be opened until the pressure therein has been dissipated and although instructions to this effect are generally provided by the manufacturer of the cooker many persons nevertheless have been badly burned in the use of pressure cookers. This has occurred by the opening, that is the removal of the lid, of the cooker while there is still a dangerous pressure therein. When this takes place the hot contents of the cooker including grease is blown or sprayed out in all directions and consequently over the hands and arms of the person using the utensil.

The present invention has as its primary object the provision of a cooker having a very high safety factor in use.

A further object of the invention is the provision of a pressure cooker in which the lid is secured to and removable from the main bottom cooking vessel in a novel manner which provides a guard against a premature removal of the cooker lid or cover.

Another and further object of the invention is the provision of a pressure cooker which is comparatively cheap and simple of construction yet highly efficient in reducing to the minimum the possibility of injury to the user.

Other objects as well as novel features of construction and improved results attainable by the use of the invention will appear from the following description when read in the light of the accompanying drawings.

The broad inventive concept of the invention can be utilized in connection or combination with pressure cookers of various sizes and configurations and accordingly the invention is not to be limited to a pressure cooker having the particular and specific shape illustrated in the drawings but is to be limited only within the scope of the hereinafter following and appended claims.

In the drawings:

Fig. 1 is a vertical sectional view through a cooker embodying the invention, the cover of the cooker being in its lowermost closed position.

Fig. 2 is a fragmentary vertical sectional view illustrating the cover in a partially raised position such as it assumes prior to final removal.

Fig. 3 is a top plan view of the bottom cooking vessel.

Fig. 4 is a view in side elevation of the interior upper edge of the bottom cooking vessel illustrating the channelway for receiving one of the locking lugs of the cover.

Fig. 5 is a fragmentary plan view of the underside of the cover.

Fig. 13 is a bottom view of the cooker cover of Figs. 11 and 12.

Fig. 14 is a fragmentary vertical sectional view through the upper end of a still further modified form of the invention.

Fig. 15 is a fragmentary vertical sectional view through another and still further modified form of the invention.

Fig. 16 is a view in side elevation of the upper end of the bottom vessel of a cooker of the form illustrated in Fig. 15 of the drawings.

Figure 9:
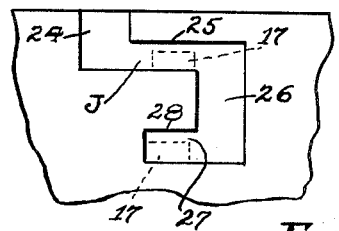
Fig. 9 is a fragmentary view in side elevation of the interior upper edge of the lower cooking vessel illustrating the channelway for the reception of the lid locking lug.
Figure 6:
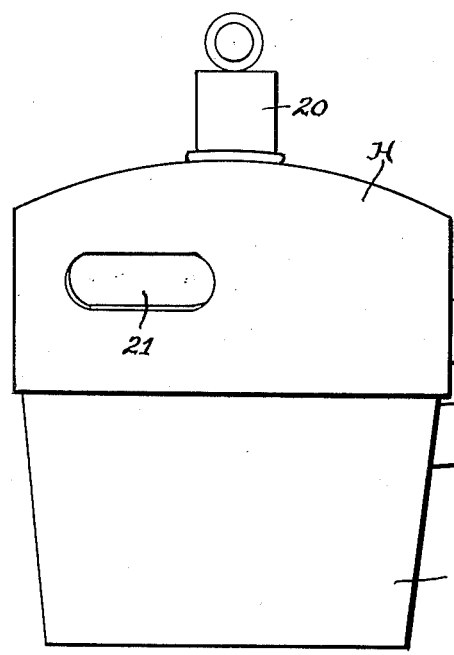
Fig. 6 is a view in side elevation of a modified form of the cooker embodying the inventive concept.
Figure 10:
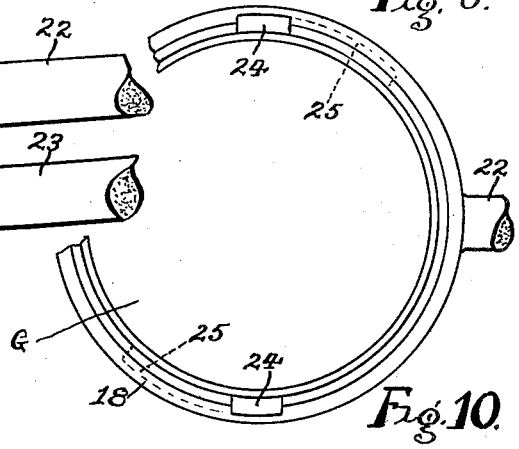
Fig. 10 is a top plan view of the lower cooking vessel.
Figure 7:
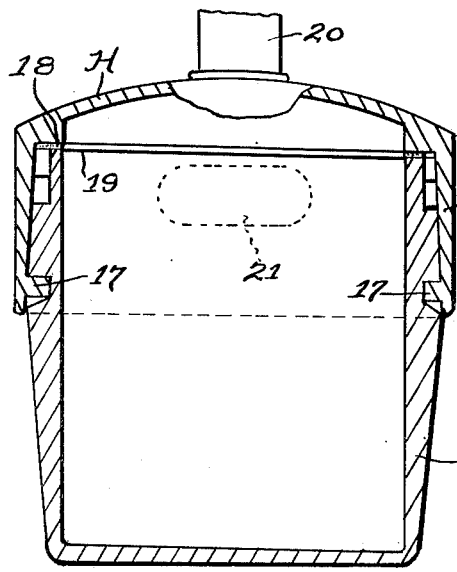
Fig. 7 is a vertical sectional view of the cooker of Fig. 6 with the lid thereof completely lowered and closed.

In all pressure cookers provision is made for tightly securing the covers to the cooker body. Ordinarily this is accomplished through a partial rotation of the cover in respect to the body. Such constructions are objectionable in that the covers can be immediately released by a partial rotation in one direction. There is a single cover locking means which when once released permits the cover to rise and if there is high internal pressure in the cooker the injuries in the form of burns, previously mentioned, result.

In the present invention a double lock is utilized for the cover which necessitates partial rotation of the cover in opposite directions before the cover can be completely removed. The release of one lock will automatically vent the internal pressure of the cooker and at the same time will direct away from the hands of the user any of the hot contents of the cooker which might be blown or sprayed outwardly from the interior of the cooker.

The present invention can be incorporated as an improvement on practically all cookers as now known and used. The cover safety flange and venting opening can be adapted to the cover of all cookers and the safety locking feature of the cover can be coordinated to operate with the particular single locking means found on pressure cookers as now manufactured.

In the accompanying drawings five forms of the inventive concept are illustrated but in all the basic principle of utilizing a cover with a depending flange is illustrated. In Figs. 1 to 5 the cover flange is internally positioned in respect to the cooker body or bottom cooking vessel while in the remaining figures of the drawings the flange of the cover is positioned externally of the cooker body.

Describing first the construction appearing in Figs. 1-5 inclusive, A is the body of a pressure cooker and has an open top which when the cooker is in operation is closed by a cover or lid B. These parts are provided with handles 1 and 2 respectively both of which extend outwardly from the same side of the cooker and for convenience in handling are in a superposed aligned relationship.

The upper edge of the cooker body A is provided with a flat circumferential part providing a shoulder 3 which at its inner edge is provided with a circumferential upstanding flange 4 which on its external face at a plurality of spaced points, eight are illustrated, is provided with outwardly extending cam elements 5 which are in parallel but spaced relation above the shoulder 3. The body, at oppositely disposed points, is provided with keyways designated as an entirety by C. Each keyway comprises a vertical channelway 6 which extends entirely through the flange 4 and at its lower end communicates with a horizontally extending channelway 7 which terminates in a vertical channelway 8 the lower end of which communicates with a horizontal extending channelway 9 which lies under the previously mentioned horizontal channelway 7. The top wall 10 of the channelway 9 is tapered so that a cam action is obtained in this channelway as will be later explained.

The cover B is provided with a comparatively deep depending circumferential flange D and on its outer face and at its lower edge is provided with a pair of oppositely positioned lugs 11. The bottom or lower edge of the cover is provided with a flat shoulder 12 of the proper size to abut the flange 3 of the body. Immediately above the shoulder 12 the cover is provided with eight spaced inwardly extending tongues 13. The cover also carries a surrounding gasket or packing 14 which when the cover is in a completely closed position has a sealing contact with the upper face of the cooker body flange 4.

It is conventional to provide pressure cookers with an internal pressure indicating gauge. In the present instance such a gauge is designated at E. No specific description of this element is necessary as any type of gauge or indicator can be used.

In respect to the cover the flange D thereof is provided with an escape opening F which is oppositely positioned in respect to the handles 1 and 2 of the cooker and is so positioned in respect to the height of the flange that this opening is closed by the side wall of the cooker body when the cover is in a closed position.

Further in respect to the cooker body we see, by reference to Fig. 2, that the cam elements 5 have their bottoms tapered as at 15. The results obtained from this construction will be particularly described hereinafter in the description of the operation of the invention.

Having described the parts constituting the cooker the operation thereof will be clearly understood from the following description. When the cover is to be applied to the cooker body the lugs 11 thereof are aligned with the vertical channelways 6. The cover can be lowered until the lugs strike the bottom of said channelways whereupon a partial rotation of the cover in a counterclockwise direction is necessary to carry the lugs along the horizontal channelway 7 and into the vertical channelway 8. The cover can now be lowered until the lugs reach the lower ends of these channelways whereupon a partial rotation of the cover in a clockwise direction is necessary which carries the lugs into and along the bottom or lower horizontal channelway 9. Due to the inclined top 10 of this channelway a cam action is exerted upon the lugs which results in pulling the cover tightly downward. This clamps the cover gasket or packing 14 in tight pressure engagement with the upper end of the body flange 4.

By reference to Fig. 1 it will be seen that with the cover in a completely closed position the escape opening F of the cover flange is sufficiently far below the upper end of the cooker body as to be completely closed by the side wall of the body.

When the cooking operation is completed and the cover is to be removed a reversal of the described operation is followed. First the lugs are moved into the vertical channelway 8 and then into the horizontal channelway 7. At this time the lugs are resting upon the bottom of this channelway and under the top of the channelway as illustrated in Fig. 4 and the cover is in only a partially raised position as is illustrated in Fig. 2. This partial elevation of the cover has moved the flange escape opening F above the upper end of the pressure body with the result that any internal pressure within the cooker can freely escape. Should there be any outward spraying or discharge of the hot contents of the body these will be in a direction away from the hands of the user because the escape opening is at the far side of the cooker from the handles 1 and 2 thereof.

The escape of the internal pressure within the cooker will be very rapid and quite promptly the cover can be further rotated to register its lugs 11 with the vertical channelways 6 at which time the cover can be freely lifted from the body.

In addition to the downward pull exerted on the cover by the described cam action on the lugs a further downward pressure is exerted by reason of the cam action between the body cam elements 5 and the cover carried tongues 13.

The modified form of the invention as illustrated in Figs. 6-10 differs primarily from the construction thus far described in having the cover flange disposed exteriorly of the cooker body and in the elimination of the cooperating cam elements 5 and cover tongues 13.

In this form of the invention there is a cooker body G provided with an open upper end which is closed by a cover H. The cover is provided with a deep depending flange 16 which adjacent its lower end and at its inner side is provided with a pair of oppositely positioned inwardly extending lugs 17. Internally the cover is provided with a shoulder 18 to which is suitably attached a gasket or packing ring or element 19. A pressure indicator 20 of any desired form is provided on the top of the cover. The cover flange is provided with an escape opening 21 which is oppositely positioned in respect to the handles 22 and 23 of the utensil and is so positioned in respect to the height of the flange as to be below the upper end of the cooker body when the cover is in a lowered or closed position as is clearly illustrated in Figs. 6 and 7.

The cooker body is provided in the outer face of its upper end with oppositely disposed keyways J which are similar in construction and operation to the previously described keyways C. Specifically the keyways comprise a vertical channelway 24 having open upper ends at the top edge of the cooker body. This channelway communicates with a horizontally extending channelway 25 which in turn communicates with a vertical channelway 26 which communicates with a horizontally extending channelway 27 the top 28 of which is tapered or inclined so as to exert a cam action upon the cover lugs 17 as has been described in respect to the other form of the invention.

Figure 8:
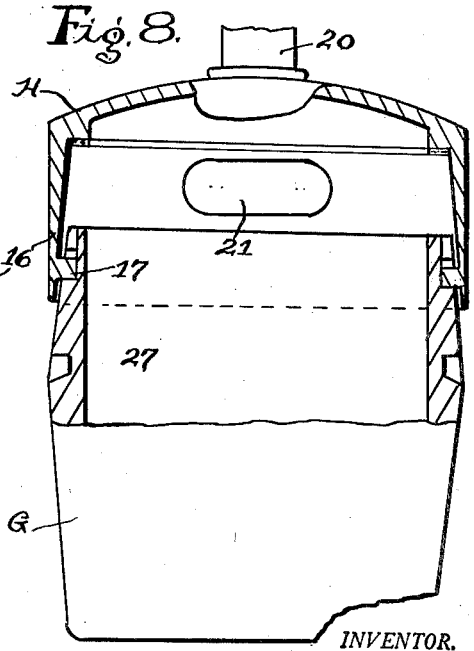
Fig. 8 is a view in side elevation, a portion thereof being in vertical section, the cooker lid being in a partly elevated position.

In operation and results this form of the invention is identical to that previously described. The cover is secured in its final closed and locked position by inserting the lugs in the open upper ends of the channelways 24 and thereafter giving the cover a partial rotation in opposite directions. With the cover completely lowered the escape passageway 21 of the cover is completely closed by the side wall of the cooker body. When the cover is being removed it is first only partially raised, as illustrated in Fig. 8, at which time the cover lugs are disposed in the upper horizontal channelways 25 as illustrated in dotted lines in Fig. 9. With the cover in this position the lid flange escape opening 21 is above the upper end of the cooker body to permit the escape of pressure and steam from the body. Due to the position of this escape opening any discharge from the interior of the body is away from the hands of the user to thus prevent any possibility of the user being burned.

Figure 11:
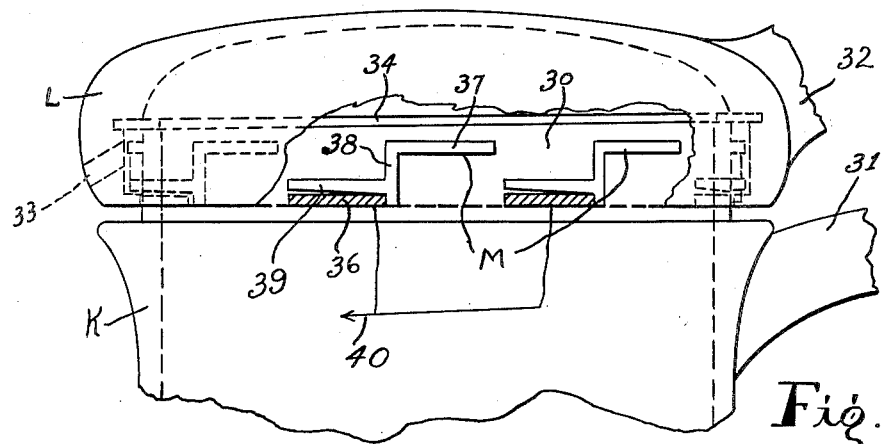
Fig. 11 is a view in side elevation of the upper end of a cooker embodying a modified form of the invention, the cooker cover being shown in a closed position and partly broken away.
Figure 12:
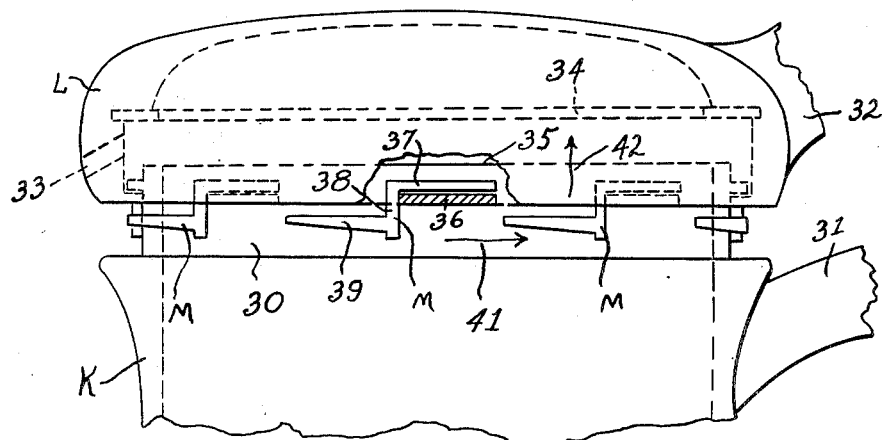
Fig. 12 is a view similar to Fig. 11 with the cooker cover being shown in a partly elevated position.

Figs. 11 to 13 illustrate a slight modification of that form of the invention appearing in Fig. 8 of the drawings.

In this form the body K of the utensil is provided with an inset and upwardly extending circumferential flange 30 and is provided at one side with a handle 31. The utensil lid or cover L telescopically receives the body flange and is provided with a handle 32 above and in alignment with the body handle 31. Opposite the handle the depending side wall of the lid is provided with a plurality of escape openings 33. Interiorly the lid is provided with a ring gasket 34 which when the cover is in a completely closed position has sealing engagement with the upper edge 35 of the body flange 30.

Exteriorly and in spaced relation around its circumference the flange 30 is provided with a plurality of cams which are designated as an entirety by M. Interiorly the lower end or edge of the lid is provided with a similar number of lugs 36. Each cam M comprises a top horizontal leg 37 from the end of which is a depending vertical leg 38 adjacent the lower end of which is an outwardly extending cam leg 39.

From the description given of the other forms of the invention a few words will suffice to describe the operation of this form of the invention. The lid is shown in a completely closed position in Fig. 11 and it will be seen that each of the lugs 36 is beneath a cam leg 39 and is exerting a downward sealing pressure upon the gasket ring 34. When it is desired to open the utensil the lid is rotated in a direction indicated by the arrow 40 until the lugs are clear of the cam legs 39 at which time the lid can be elevated to the safety position illustrated in Fig. 12. Complete removal of the lid at this time is prevented by the upper legs 37 of the members M and the escape passageways 33, formerly closed as is clearly seen from Fig. 11, are now open to permit the escape of steam and pressure which escaping is away from the handles of the utensil. When the internal pressure has been reduced complete removal of the lid is attained by a partial rotation of the lid in the opposite direction, as indicated by the arrow 41 in Fig. 12, and then a vertical lifting of the lid, as indicated by the arrow 42. This vertical lifting is possible because the lugs have been removed clear of the legs 37.

Fig. 14 discloses a construction differing from that immediately before described only in the escape opening 43 which in this instance discharges vertically downward rather than downwardly and outwardly at an angle as is the case in respect to the previously described lid escape openings 33.

Figs. 15 and 16 disclose a utensil the operation of which is on the same principle as those previously described but differs specifically in that the escape opening is in the flange of the utensil body rather than in the flange of the utensil lid.

Specifically the body P is provided with an inset and upwardly circumferential flange 44 provided intermediate its height and opposite the handles of the utensil with an escape opening 45. This flange exteriorly is provided with the same plurality of locking cams M and the lid at its lower internal edge is provided with the same lugs 36 for cooperative engagement therewith. Additionally the lid is provided with the same sealing gasket 34. An additional sealing gasket 46 is provided which surrounds the body flange 44 and is disposed upon the circumferential shoulder 47 of the cooker body P.

In operation this form of the invention is the same as has previously been described. That is to say, when the cover is completely lowered the escape opening is closed by the lid and the two gaskets 34 and 47. When the lid is in its intermediate position the escape opening is open, as appears in Fig. 15, and the complete removal of the lid is attained by a further rotative movement of the lid as has been previously described.

From the foregoing it will be seen that in all of its forms the invention provides a pressure cooker which safeguards the user against injury by burns but it is obvious that specific modifications of the construction can be made without departing from the inventive concept. Accordingly the invention is to be limited only within the scope of the following claims.

We claim:

1. In a pressure cooker, a lower body having an open upper end, a cover therefor provided with a downwardly extending circumferential flange, said cover flange and body having interlocking means selectively locking the flange to the body with the cover completely lowered and closed or partially elevated, a second locking means operative to secure the cover and body together in sealing relationship when the cover is completely lowered, adjacently positioned handles for said body and cover, a passageway through the cover flange oppositely and remotely positioned in respect to said handles, the side wall of the body closing said passageway when the cover is completely lowered, and said passageway being above the body side wall and open when the cover is moved to its locked partly elevated position.

2. A construction as defined in claim 1 wherein, the cover flange is disposed within the cooker body.

WILLIAM LOTTER.
MINNA LOTTER.

References Cited in the file of this patent

UNITED STATES PATENTS

| Number | Name | Date |
|---|---|---|
| 993,013 | Bartlett | May 23, 1911 |
| 1,369,249 | Kroupa | Feb. 22, 1921 |
| 1,521,093 | Hall | Dec. 30, 1924 |
| 1,671,025 | Franzmeier | May 22, 1928 |
| 1,834,837 | Hashimoto | Dec. 1, 1931 |
| 2,055,819 | Georger | Sept. 29, 1936 |
| 2,177,123 | Wittenberg | Oct. 24, 1939 |
| 2,198,125 | Nelson | Apr. 23, 1940 |
| 2,218,188 | Wittenberg | Oct. 15, 1940 |
| 2,225,448 | Hamilton | Dec. 17, 1940 |
| 2,387,360 | Smith | Oct. 23, 1945 |
| 2,399,115 | Hansen et al. | Apr. 23, 1946 |

FOREIGN PATENTS

| Number | Country | Date |
|---|---|---|
| 285,185 | Italy | May 4, 1931 |
| 505,192 | Germany | Aug. 14, 1930 |
| 524,940 | Great Britain | Aug. 19, 1940 |